(12) United States Patent
Kim et al.

(10) Patent No.: US 11,933,514 B2
(45) Date of Patent: Mar. 19, 2024

(54) AIR CONDITIONER USING GAS SENSING DATA AND CONTROL METHOD THEREFOR

(71) Applicant: SAMSUNG ELECTRONICS CO., LTD., Suwon-si (KR)

(72) Inventors: Jaehong Kim, Suwon-si (KR); Yongwon Jeong, Suwon-si (KR); Joonho Kim, Suwon-si (KR); Jangpyo Park, Suwon-si (KR); Sanghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 17/283,101

(22) PCT Filed: Oct. 8, 2019

(86) PCT No.: PCT/KR2019/013153
§ 371 (c)(1),
(2) Date: Apr. 6, 2021

(87) PCT Pub. No.: WO2020/130308
PCT Pub. Date: Jun. 25, 2020

(65) Prior Publication Data
US 2021/0381713 A1 Dec. 9, 2021

(30) Foreign Application Priority Data
Dec. 19, 2018 (KR) .................. 10-2018-0165206

(51) Int. Cl.
*F24F 11/65* (2018.01)
*F24F 5/00* (2006.01)
(Continued)

(52) U.S. Cl.
CPC ............ *F24F 11/65* (2018.01); *F24F 5/0046* (2013.01); *F24F 8/20* (2021.01); *F24F 8/80* (2021.01);
(Continued)

(58) Field of Classification Search
CPC ...................................... F24F 11/65
See application file for complete search history.

(56) References Cited

U.S. PATENT DOCUMENTS 5,255,556 A * 10/1993 Lobdell .................. G01W 1/04
340/602
2004/0253917 A1 * 12/2004 Kim ........................ F24F 13/18
454/200
(Continued)

FOREIGN PATENT DOCUMENTS

EP  3 540 420   9/2019
EP  3 783 671   2/2021
(Continued)

OTHER PUBLICATIONS

International Search Report for PCT/KR2019/013153 dated Jan. 16, 2020, 4 pages, with English Translation.
(Continued)

*Primary Examiner* — Nathan L Laughlin
(74) *Attorney, Agent, or Firm* — Nixon & Vanderhye, P.C.

(57) ABSTRACT

An air conditioner is disclosed. The air conditioner comprises a storage, and a processor for identifying a target space on the basis of first gas sensing data, moving the air conditioner to the target space, acquiring information about a gas type on the basis of second gas sensing data sensed within the target space and reference data stored in the storage, and performing an air conditioning operation on the basis of the information about the gas type, wherein the gas
(Continued)

US 11,933,514 B2

Page 2 sensing data is sensed by a sensor comprising a plurality of sensing modules that react to different gases.

18 Claims, 18 Drawing Sheets

(51) Int. Cl.
*F24F 8/20* (2021.01)
*F24F 8/80* (2021.01)
*F24F 8/95* (2021.01)
*F24F 110/66* (2018.01)

(52) U.S. Cl.
CPC ........ *F24F 8/95* (2021.01); *F24F 2005/0064* (2013.01); *F24F 2110/66* (2018.01)

(56) References Cited

U.S. PATENT DOCUMENTS

| 2006/0059872 | A1* | 3/2006 | Lee ..................... B01D 46/46 55/356 |
| 2011/0271839 | A1 | 11/2011 | Kim et al. |
| 2017/0261979 | A1* | 9/2017 | Km ..................... G01N 33/0034 |
| 2017/0326724 | A1 | 11/2017 | Wei et al. |
| 2018/0306455 | A1* | 10/2018 | Kelly ..................... F24F 11/30 |
| 2019/0383505 | A1* | 12/2019 | Kim ..................... F24F 13/24 |
| 2020/0179910 | A1 | 6/2020 | Park et al. |
| 2020/0363081 | A1 | 11/2020 | Park et al. |
| 2020/0400631 | A1* | 12/2020 | Gao ..................... G01N 27/64 |
| 2021/0128769 | A1* | 5/2021 | Zhang ..................... A61L 9/014 |

FOREIGN PATENT DOCUMENTS

| JP | 2008-055362 | 3/2008 |
| JP | 4133844 | 8/2008 |
| JP | 2015-081757 | 4/2015 |
| KR | 10-2007-0098024 | 10/2007 |
| KR | 10-1030989 | 4/2011 |
| KR | 10-2017-0086246 | 7/2017 |
| KR | 10-2018-0043163 | 4/2018 |
| KR | 10-2018-0066824 | 6/2018 |
| KR | 10-2018-0080403 | 7/2018 |
| KR | 10-2019-0016447 | 2/2019 |
| KR | 10-2019-0084671 | 7/2019 |
| KR | 10-2019-0099773 | 8/2019 |
| KR | 10-2020-0010877 | 1/2020 |
| KR | 10-2020-0087337 | 7/2020 |
| WO | 2018/074864 | 4/2018 |

OTHER PUBLICATIONS

Written Opinion for PCT/KR2019/013153 dated Jan. 16, 2020, 9 pages, with English Translation.
Office Action dated Feb. 22, 2023 in Korean Patent Application No. 10-2018-0165206 and English-language translation.

* cited by examiner

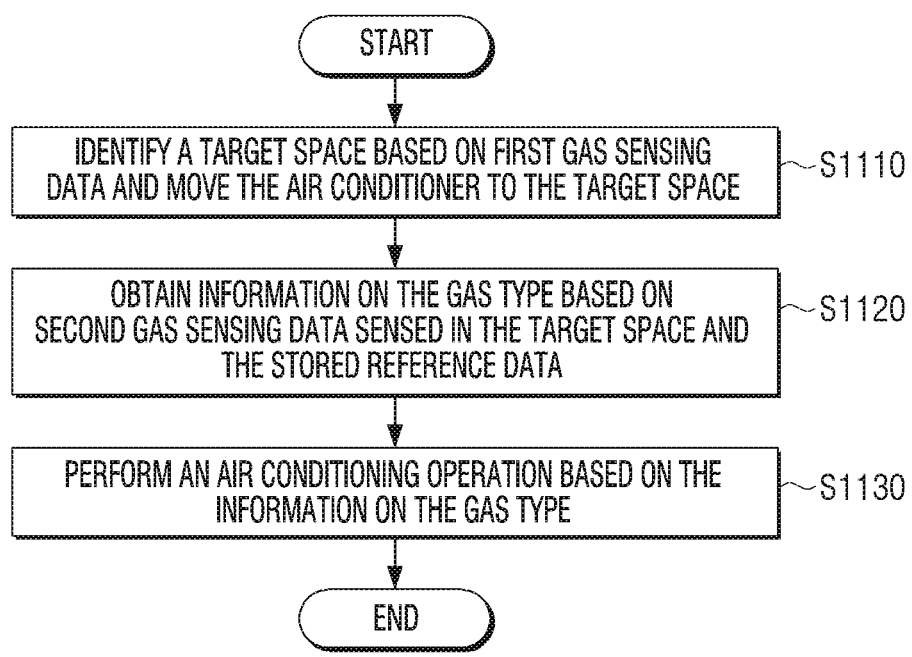

AIR CONDITIONER USING GAS SENSING DATA AND CONTROL METHOD THEREFOR

This application is the U.S. national phase of International Application No. PCT/KR2019/013153 filed Oct. 8, 2019 which designated the U.S. and claims priority to KR Patent Application No. 10-2018-0165206 filed Dec. 19, 2018, the entire contents of each of which are hereby incorporated by reference.

BACKGROUND

Field

This disclosure relates to a movable air conditioner based on sensing data and a control method thereof.

Description of Related Art

A related-art air conditioner apparatus has a limited usable area according to a conditioning capability and thus there is a limit to improve indoor air quality of a space which is beyond the usable area of the indoor space in which an air conditioner is installed. In addition, in order to improve the air quality of each space, there is a problem that a user should move and operate an air conditioner or a plurality of air conditioners should be installed. If pollution levels are different for each space, a user may have an inconvenience to operate the air conditioner differently for each space.

Further, there is no air conditioner which is capable of measuring and removing harmful gas (for example, formaldehyde, toluene, etc.), subject to indoor regulation, which a user may not recognize.

SUMMARY

It is an object of the disclosure to provide an air conditioner for improving air quality of a plurality of spaces by using one (or minimum) movable air conditioner, and measuring and removing harmful gas which cannot be recognized by a user, and a control method thereof.

According to an embodiment, an air conditioner may include a storage and a processor configured to identify a target space based on first gas sensing data, move the air conditioner to the target space, obtain information about a gas type based on second gas sensing data sensed within the target space and reference data stored in the storage, and perform an air conditioning operation based on the information about the gas type.

The second gas sensing data may be sensed by a sensor comprising a plurality of sensing modules that react to different gases.

The reference data may include learning data that learns a reaction pattern of the plurality of sensing modules for each of a plurality of gas types.

The processor may obtain information about the gas type based on reaction patterns of each of the plurality of sensing modules for the second gas sensing data and the learning data.

According to an embodiment, the first gas sensing data and the second gas sensing data may be data sensed by a same sensor, and the sensor may be a first sensor provided inside the air conditioner.

According to another embodiment, the first gas sensing data and the second gas sensing data may be data sensed by a same sensor, the sensor may be a second sensor positioned inside the target space, and the processor may move the air conditioner to the target space based on the first gas sensing data received from the second sensor, and perform the air conditioning operation based on the second gas sensing data received from the second sensor.

According to another embodiment, the first gas sensing data may be data sensed by an external sensor positioned within the target space, and the second gas sensing data may be data sensed by an internal sensor provided in the air conditioner.

The external sensor may include a solar heat charging panel.

The processor may obtain information about the gas type and information about gas concentration based on the second gas sensing data, identify an air cleaning mode based on the information about the gas type and the information about the gas concentration, and perform an air cleaning operation based on the air cleaning mode.

The processor may identify a rotational speed of the air conditioner based on at least one of the information about the gas type or the information about the gas concentration, and rotate the air conditioner based on the rotational speed.

The air conditioner may further include a communication unit.

The processor may generate a control signal to control at least one external device based on the second gas sensing data obtained from the target space, and control the communication unit to transmit the generated control signal to the at least one external device performing a function related to an air conditioning operation.

The storage may store information which integrates at least one of gas type information or gas concentration information, and the context information for the target space.

The processor may identify a current context for the target space based on the second gas sensing data, generate a control signal to control at least one external device based on the identified context, and control the communicator to transmit the generated control signal to the at least one external device performing a function related to an air conditioning operation.

The context information may be obtained based on information received from an external device or a user input.

The plurality of sensing modules may sense at least one of toluene or formaldehyde.

According to an embodiment, a control method of an air conditioner may include identifying a target space based on first gas sensing data and moving the air conditioner to the target space, obtaining information about a gas type based on second gas sensing data sensed within the target space and the stored reference data, and performing an air conditioning operation based on the information about the gas type.

The second gas sensing data may be sensed by a sensor comprising a plurality of sensing modules that react to different gases.

The reference data may include learning data that learns a reaction pattern of the plurality of sensing modules for each of a plurality of gas types.

The obtaining information about a gas type may include obtaining information about the gas type based on reaction patterns of each of the plurality of sensing modules for the second gas sensing data and the learning data.

According to an embodiment, the first gas sensing data and the second gas sensing data may be data sensed by a same sensor, and the sensor may be a first sensor provided inside the air conditioner.

According to another embodiment, the first gas sensing data and the second gas sensing data may be data sensed by a same sensor, and the sensor may be a second sensor positioned inside the target space. The moving may include moving the air conditioner to the target space based on the first gas sensing data received from the second sensor, and the performing the air conditioning operation may include performing the air conditioning operation based on the second gas sensing data received from the second sensor.

According to yet another embodiment, the first gas sensing data may be data sensed by an external sensor positioned within the target space, and the second gas sensing data may be data sensed by an internal sensor provided in the air conditioner.

The external sensor may include a solar heat charging panel.

The obtaining information about the gas type may include obtaining information about the gas type and information about gas concentration based on the second gas sensing data.

The performing the air conditioning operation may include identifying an air cleaning mode based on the information about the gas type and the information about the gas concentration, and performing an air cleaning operation based on the air cleaning mode.

The performing the air conditioning operation may include identifying a rotational speed of the air conditioner based on at least one of the information about the gas type or the information about the gas concentration, and rotating the air conditioner based on the rotational speed.

As described above, according to various embodiments, by sensing and removing a harmful gas which a user may not recognize, causing a disease may be prevented.

By using one movable air conditioner, the air quality of the entirety of various indoor spaces, such as home, childcare facilities, offices, or the like, may be easily improved.

In addition, the air quality may be efficiently improved in response to a change in the air quality of the individual indoor spaces, without a user's manipulation, by using one movable air conditioner and a gas sensing device installed in the at least one space.

While a user is out, current indoor air quality may be identified so that air quality may be improved through a remote control.

By operating an Internet of Things (IoT) device (kitchen hood, a building clean ventilation system, an air conditioner, a humidifier, etc.) related to the operation of the air conditioner in accordance with various situations, it is possible to continuously maintain a pleasant indoor air quality.

DETAILED DESCRIPTION

Figure 7A:
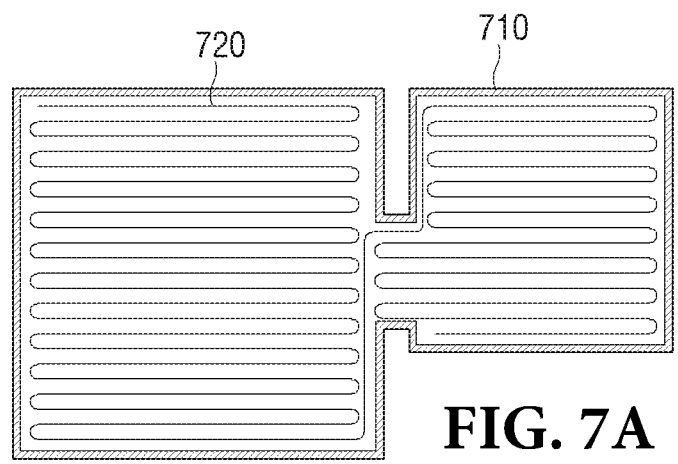
Figure 7B:
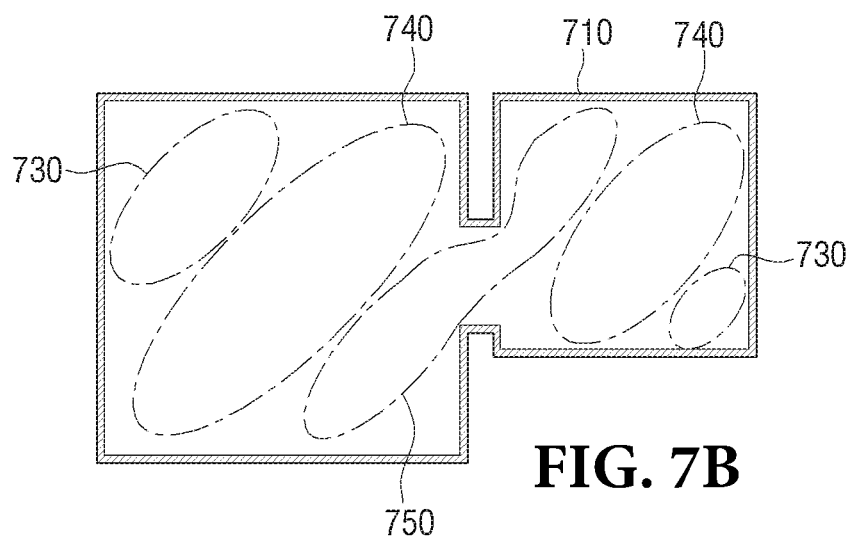
Figure 7C:
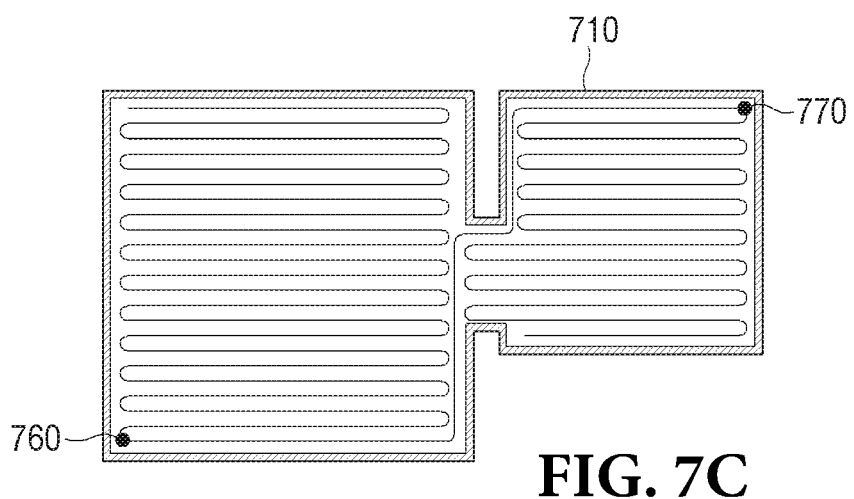

FIGS. 7A, 7B, and 7C are diagrams illustrating an operation to obtain a structure of an indoor space and an air quality map according to an embodiment.

Figure 8A:
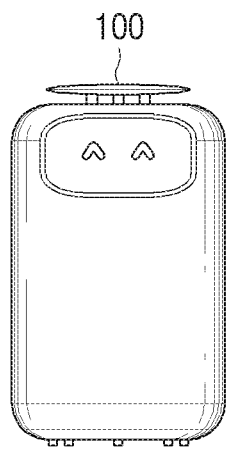
Figure 8B:
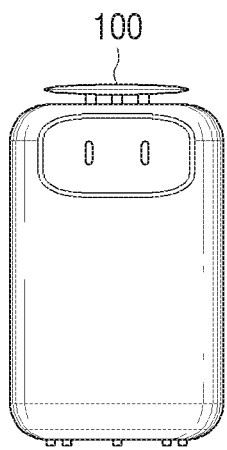
Figure 8C:
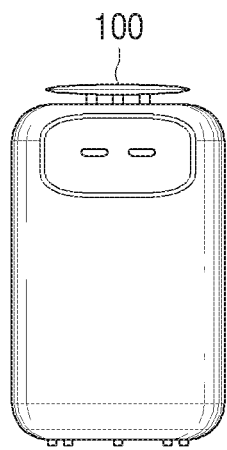

FIGS. 8A, 8B, and 8C are diagrams illustrating an operation representing a condition of indoor air quality according to facial expressions displayed on an air conditioner according to an embodiment.

Figure 9:
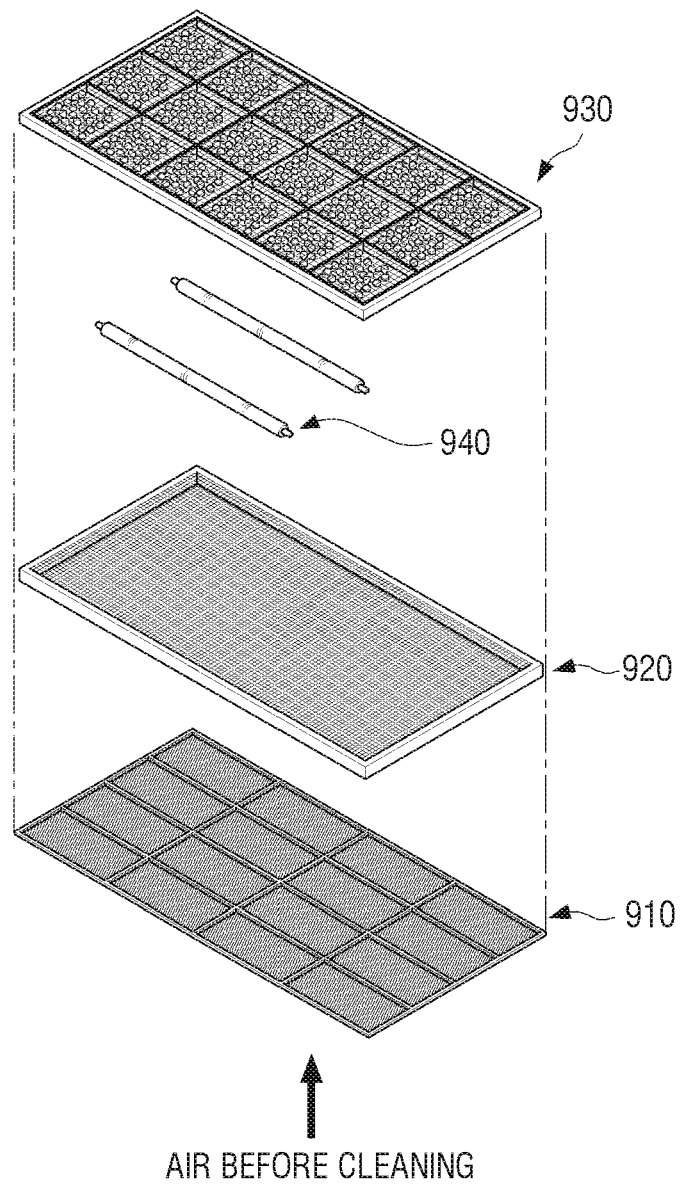

FIG. 9 is an exploded perspective view of a cleaning unit according to an embodiment.

FIGS. 10A, 10B, 10C, and 10D are diagrams illustrating an embodiment of using data about air quality periodically measured according to an embodiment.

Figure 10A:
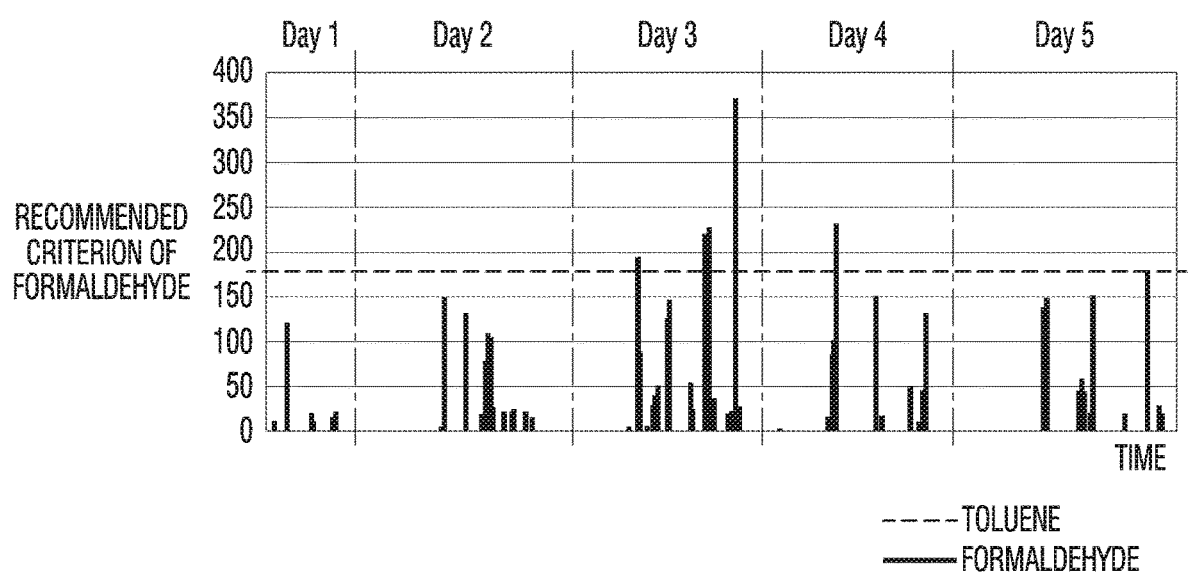
Figure 10B:
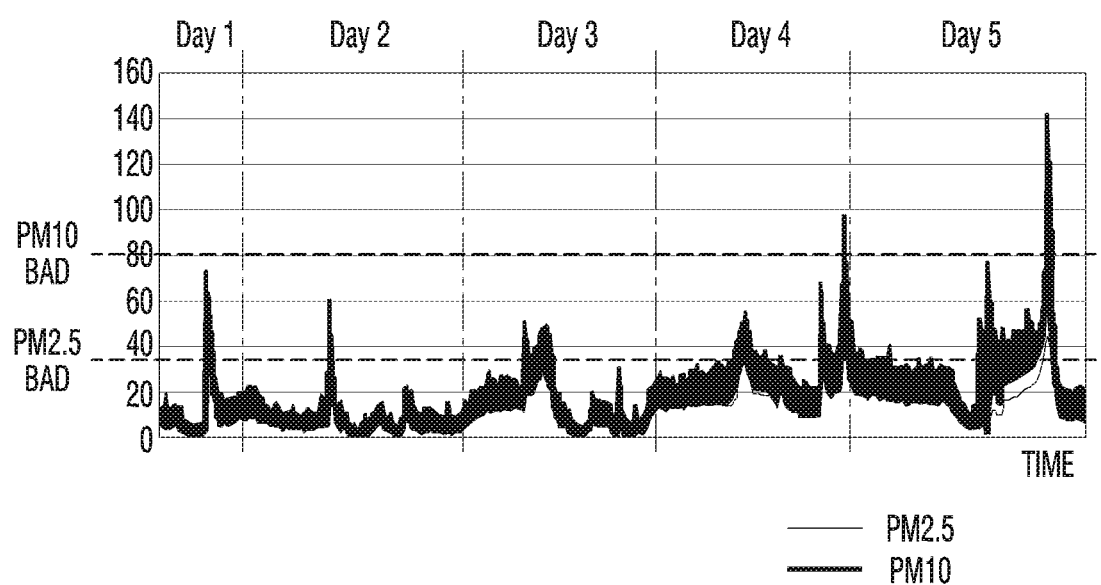
Figure 10C:
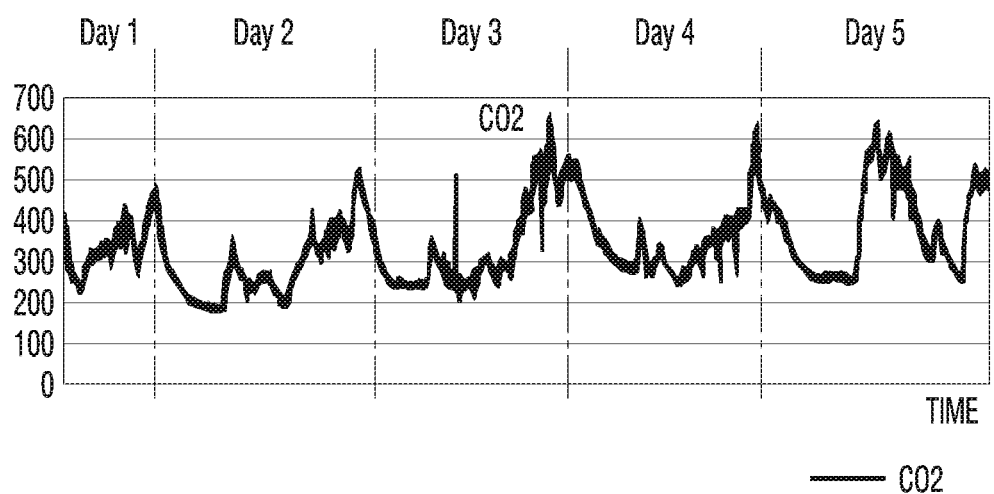
Figure 10D:
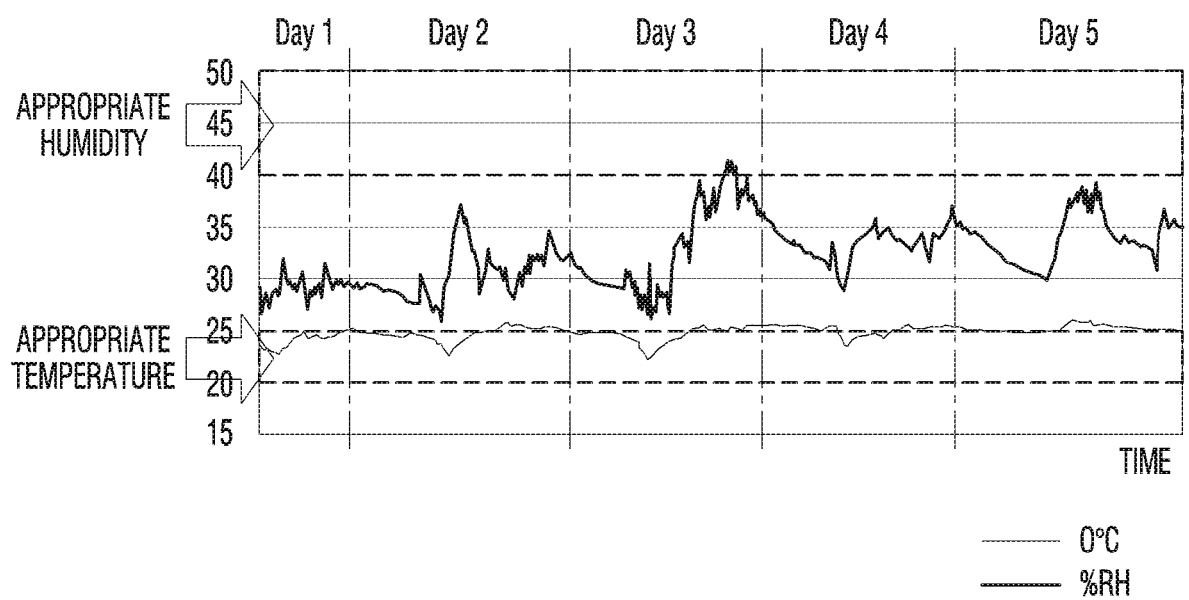
Figure 10E:
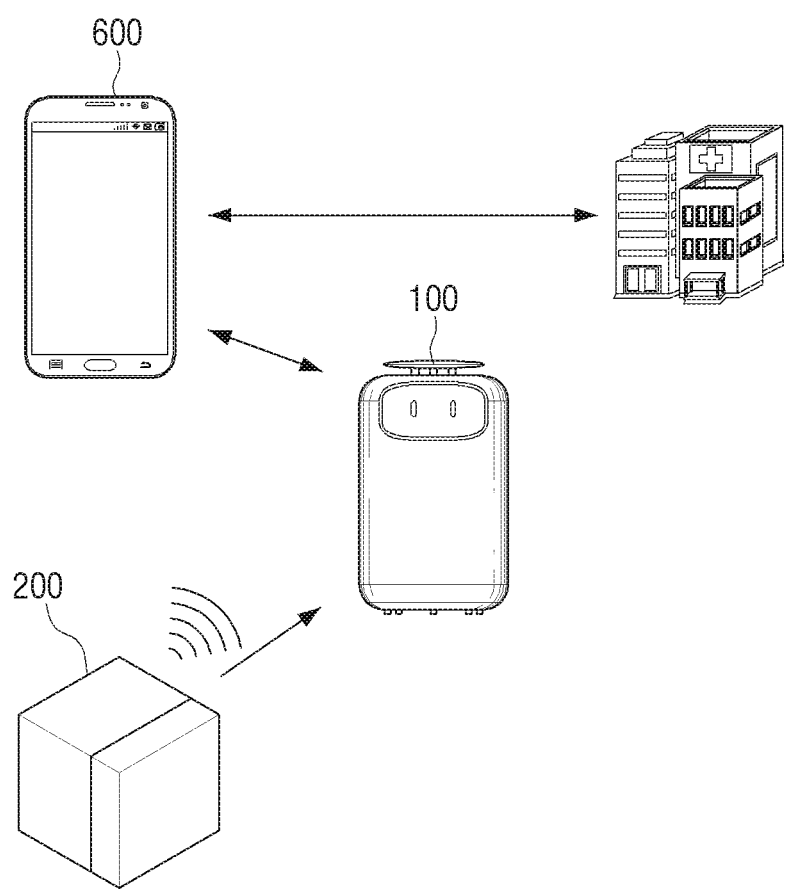

FIG. 10E is a diagram illustrating an embodiment of using measured data.

FIG. 11 is a flowchart illustrating a control method of an air conditioner according to an embodiment.

BEST MODE FOR CARRYING OUT THE INVENTION

Mode for Carrying Out the Invention

The disclosure will be described in detail with reference to attached drawings.

After terms used in the present specification are briefly described, the disclosure will be described in detail.

The terms used in the present disclosure and the claims are general terms identified in consideration of the functions of the various embodiments of the disclosure. However, these terms may vary depending on intention, technical interpretation, emergence of new technologies, and the like, of those skilled in the related art. Unless a specific definition of a term is provided, the term may be understood based on the overall content and technological understanding of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. A detailed description of known configurations related to the disclosure may be omitted so as to not obscure the gist of the disclosure.

A singular expression includes a plural expression, unless otherwise specified. It is to be understood that the terms such as "comprise," "comprising," "including," and the like, are used herein to designate a presence of a characteristic, number, step, operation, element, component, or a combination thereof, and do not preclude a presence or a possibility of adding one or more of other characteristics, numbers, steps, operations, elements, components or a combination thereof.

Expressions such as "at least one of A or B" and "at least one of A and B" should be understood to represent "A," "B" or "A and B.".

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element).

Terms such as "module," "unit," "part," and the like, may be used to refer to an element that performs at least one function or operation, and the element may be implemented as hardware, software, or a combination of hardware and software. Further, except for when each of a plurality of "modules," "units," "parts," and the like, is implemented in an individual hardware, the components may be integrated in at least one module or chip and may be implemented by at least one processor. In the following description, a "user" may refer to a person using an air conditioner or an apparatus using an electronic apparatus (e.g., artificial intelligence electronic apparatus).

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

The embodiment will be described in detail with reference to the accompanying drawings.

Figure 1:
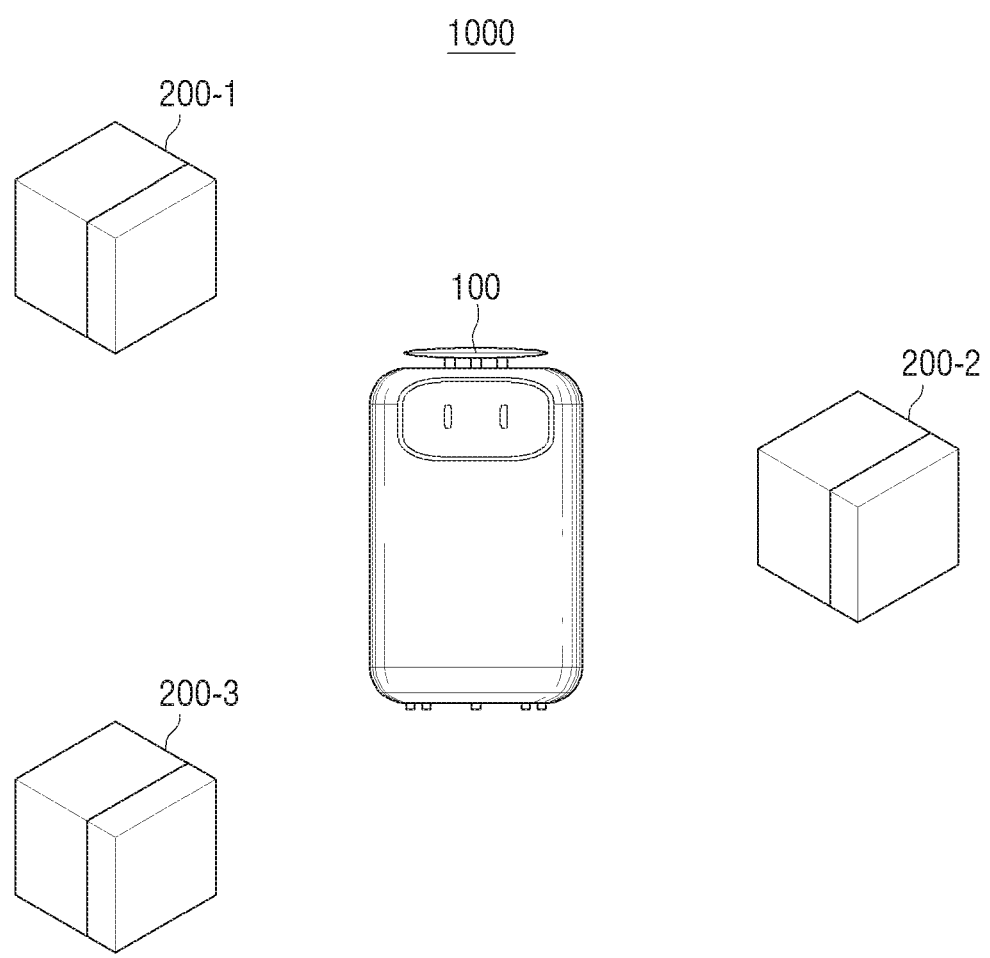
FIG. 1 is a diagram illustrating an electronic system according to an embodiment.

FIG. 1 is a diagram illustrating an electronic system according to an embodiment.

An electronic system 1000 includes an air conditioner 100 and a sensor 200.

The air conditioner 100 refers to a device for improving an air environment to be pleasant, and the air conditioner 100 according to an embodiment may be a movable device. The air conditioner 100 may be implemented as an air purifier, a humidifier, a dehumidifier, an air conditioner, an air blower, or the like, but is not limited thereto, and may be implemented with various devices capable of purifying indoor air and performing cooling, heating, dehumidification, and humidification functions. For convenience, the air conditioner 100 may be implemented as a movable air cleaner.

A sensor 200 is a device for sensing an air condition. According to an embodiment, as shown in FIG. 1, the sensor 200 may be implemented with a plurality of sensors 200-1, 200-2, and 200-3, and may be installed in different spaces. For example, the first sensor 200-1 may be installed in a living room, the second sensor 200-2 may be installed in a room, and the third sensor 200-3 may be installed in a kitchen to sense the air condition of each space. The sensor 200 may transmit gas sensing data corresponding to the sensed air condition information to the air conditioner 100, and the air conditioner 100 may perform an air conditioning operation by moving to a space in which the air quality improvement is required based on the gas sensing data. According to another embodiment, the sensor 200 may be provided inside the air conditioner 100, and the air conditioner 100 may move to an arbitrary space and may sense an indoor air condition through the sensor 200 to perform an air conditioning operation, by stopping, in a space where air quality improvement is required. According to another embodiment, the sensor 200 may include a main sensor and a sub-sensor capable of sensing air condition precisely. The main sensor may be provided inside the air conditioner 100, the sub sensor may be installed in an external space, the air conditioner 100 may be moved based on the gas sensing data sensed by the sub sensor, and the main sensor may measure a precise air condition in the moved space to perform an air conditioning operation of the air conditioner 100.

Various embodiments may be provided according to locations and types of sensors. With reference to drawings, various embodiments will be described in detail.

Figure 2:
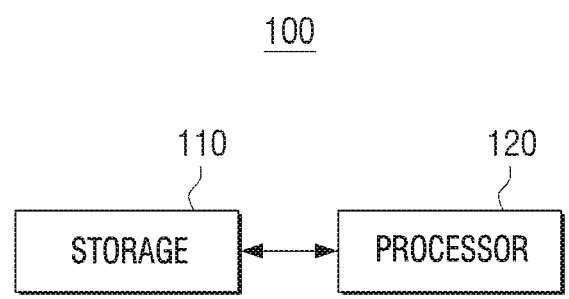
FIG. 2 is a block diagram illustrating an air conditioner according to an embodiment.

FIG. 2 is a block diagram illustrating an air conditioner according to an embodiment.

Referring to FIG. 2, the air conditioner 100 includes a storage 110 and a processor 120.

The storage 110 may store various data necessary for an operation of the air conditioner 100.

The storage 110 may be implemented as an internal memory such as a read-only memory (ROM) (e.g., electrically erasable programmable read-only memory (EEPROM), or the like) and a random-access memory (RAM), or a memory separate from the processor 120. In this case, the storage 110 may be implemented as a memory embedded within the air conditioner 100 or a memory detachable from the air conditioner 100 according to the usage of data storage. A memory embedded in the air conditioner 100 may be implemented as a non-volatile memory, a volatile memory, a hard disk drive (HDD), a solid state drive (SSD), or the like.

The storage 110 may store reference data. The reference data may include learning data which learns a reaction pattern of a plurality of sensing modules for each of a plurality of gas types. Here, the plurality of sensing modules may be modules included in a main sensor, and the reference data and the reaction pattern of the plurality of sensing modules will be described in greater detail below.

The storage 110 may store information which integrates at least one of gas type information or gas concentration information, and context information for a target space. This will be described below.

The storage 110 may store data regarding the reference gas distribution when the storage 110 is in a normal (or general) condition. The data related to the reference gas distribution may be data received from an external server (not shown) or inputted by a user. Alternatively, the data may be related to an average value of the gas distribution included in the gas sensing data sensed by the sensor 200.

The processor 120 controls overall operations of the air conditioner 100.

The processor 120 according to an embodiment may be implemented with a digital signal processor (DSP), a microprocessor, and a time controller (TCON), or the like, but the processor is not limited thereto. The processor 120 may include, for example, and without limitation, one or more among a central processor (CPU), a micro controller unit (MCU), a microprocessor unit (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type which a processing algorithm is built therein, application specific integrated circuit (ASIC), or in a field programmable gate array (FPGA) type. The processor 120 may perform various functions by executing computer executable instructions stored in a storage (not shown).

According to an embodiment, the processor 120 may identify a target space based on first gas sensing data, move the air conditioner 100 to a target space, obtain information on a gas type based on the second gas sensing data sensed in the target space and reference data stored in the storage 110, and perform an air conditioning operation based on the information on the gas type.

Various embodiments may be provided according to a type and installation location of the sensor 200 sensing the first gas sensing data and the second gas sensing data, wherein the type of the sensor 200 may be divided into a main sensor and a sub sensor. A sub sensor may not be required according to an embodiment, and various embodiments will be described in detail.

First Embodiment

The first embodiment is a case where a main sensor is provided inside the air conditioner 100, and a separate sub-sensor is not present. In the first embodiment, a main sensor provided inside the air conditioner 100 is collectively referred to as a first sensor for convenience.

The processor 120 may identify a target space based on the first gas sensing data sensed by the first sensor and may move the air conditioner 100 to a target space.

The first gas sensing data is data for indoor gas used to identify a target space to which the air conditioner 100 is to move, and may include data about the gas distribution.

The processor 120 may move the air conditioner 100 to an arbitrary space to sense the indoor gas by the first sensor, and may identify whether the indoor gas is in a normal (or general) condition in real time. The processor 120 may identify an abnormal condition when gas distribution different from the data of the reference gas distribution stored in the storage 110 is identified.

The processor 120 may operate the first sensor in a low power mode to obtain first gas sensing data. The low-power mode may be a mode for identifying only a normal condition of the indoor gas, and may be a mode in which power usage is reduced.

For example, the processor 120 may move the air conditioner 100 to the kitchen space if a distribution different from the reference gas distribution is identified based on the first gas sensing data sensed by the first sensor in a space adjacent to the kitchen. By identifying the abnormality of an indoor air environment in a low power mode prior to sensing the gas data precisely, power usage may be reduced.

The processor 120 may obtain second gas sensing data by the first sensor in the target space. The second gas sensing data may be data sensed by the first sensor including a plurality of sensing modules that react to different gases. The first gas sensing data and the second gas sensing data are data sensed by the same first sensor.

The processor 120 may obtain information about the gas type based on the sensed gas sensing data and the reference data stored in the storage 110.

The processor 120 may operate the first sensor in a general mode to obtain second gas sensing data. The general mode may refer to a mode for sensing indoor gas precisely compared to a low power mode and may collect various data. The processor 120 may then compare the second gas sensing data and the stored reference data to obtain information about the gas type. For example, the processor 120 may compare the second gas sensing data and the reference data and identify that formaldehyde and ammonia gas are included in the target space.

The reference data may include learning data which learns a response pattern of a plurality of sensing modules for each of a plurality of gas types.

The first sensor, i.e., a main sensor, may include a plurality of sensing modules that differently react to different gases. The main sensor including the plurality of sensing modules will be described in detail with reference to FIG. 4.

Figure 4:
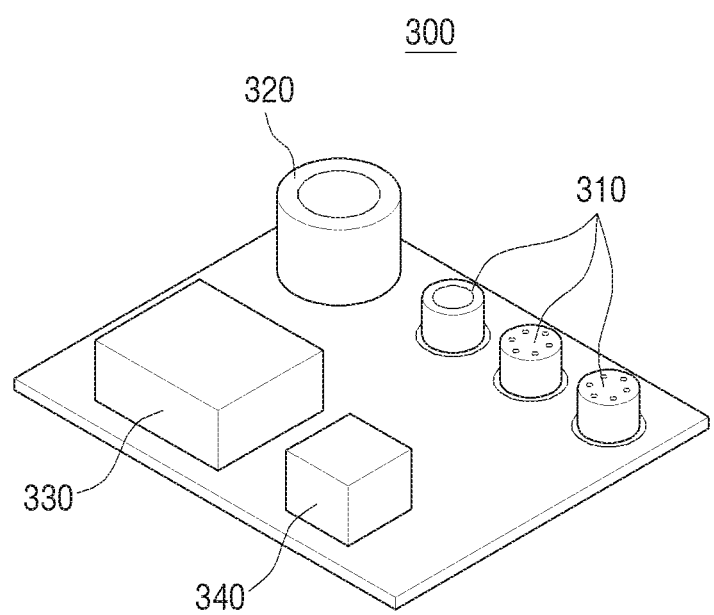
FIG. 4 is a diagram illustrating a main sensor including a plurality of sensing modules according to an embodiment.

FIG. 4 is a diagram illustrating a main sensor including a plurality of sensing modules according to an embodiment.

A main sensor 300 may include a plurality of sensing modules 310 composed of a semiconductor type or an electrochemical module. Each of the plurality of sensing modules 310 may react to different gases. For example, a first sensing module among the plurality of sensing modules 310 may react to gas A at 70, react to gas B at 40, and react to gas C at 50. The second sensing module may also react to gas A at 20, react to gas B at 30, and react to gas C at 50. The information on the reaction value of each of the plurality of sensing modules 310 may be included in the second gas sensing data. Accordingly, the reaction value of the first sensing module may be sensed as 70, and the gas sensed of which reaction value is sensed as 20 in the second sensing module 20 may be identified as gas A. As described above, the databased reference data may be generated by mapping a reaction value sensed by each sensing module with corresponding gas types. The processor 120 may compare the second gas sensing data sensed by the main sensor with the stored reference data to obtain information on the gas type. An embodiment of identifying a gas type from second gas sensing data and reference data will be described in detail with reference to FIG. 5.

The main sensor 300 may additionally include a carbon dioxide sensing module 320 for identifying carbon dioxide (CO2), a temperature/humidity sensing module 330 for measuring temperature and humidity, and a fine dust sensing module 340 for measuring fine dust.

The fine dust sensing module may sense fine dust of PM 10, PM 2.5 and PM 1.0 according to module types, but is not limited thereto.

An arrangement state of the sensing module shown in FIG. 4 is merely an example and arrangement may be changed in various forms. For example, the fine dust sensing module 340 may be disposed on a surface different from the plurality of sensing modules 310.

Returning to FIG. 2, the operation below is common to embodiments 1 to 3.

The processor 120 may perform an air conditioning operation based on obtained information on the gas type. For example, if the gas identified as being present in the target space corresponds to a harmful gas subject to indoor regulation, the processor 120 may perform an air cleaning operation. For example, the harmful gas subject to indoor regulation may include toluene, formaldehyde, or the like.

The processor 120 may obtain information on the gas concentration as well as information on the gas type based on the second gas sensing data. The processor 120 may identify an air clean mode based on information about the gas type and information about the gas concentration, and perform an air cleaning operation based on the air clean mode. For example, if the gas identified as being present in the target space corresponds to a harmful gas subject to indoor regulation, the processor 120 may select a harmful gas removal mode and perform a corresponding clean operation. If the identified gas is fine dust, the processor 120 may select a general mode and perform a general clean operation.

The processor 120 may also adjust the intensity of the cleaning according to the identified concentration of the gas.

For example, when the concentration of the harmful gas is less than or equal to the first threshold value, the processor 120 may perform a clean operation at an intensity of "weak", when the concentration of the harmful gas is greater than or equal to the first threshold and less than or equal to a second threshold value, may perform a clean operation with an intensity of "medium", and when the concentration of the harmful gas is greater than or equal to the second threshold value, may perform a clean operation at an intensity of "strong." According to the number of thresholds, the intensity of cleaning may be further subdivided.

The processor 120 may also identify the rotational speed of the air conditioner 100 based on at least one of information about the gas type or information about the gas concentration, and rotate the air conditioner 100 in accordance with the identified rotational speed. The processor 120 may identify a rotational speed based on the rotational speed information stored in the storage 110. The rotational speed information may be information on a rotational speed corresponding to at least one of the information on the gas type or information on the gas concentration. For example, if the indoor air quality is "good", the rotational speed may be a, and when the indoor air quality is "bad", the rotational speed may be b, which is faster than a, and a value related to the a and b according to the indoor air quality may be included in the rotational speed information. Here, a and b are examples and may be further subdivided. Alternatively, the rotational speed information may be received from an external server.

For example, if the identified type of gas corresponds to harmful gas subject to indoor regulation, the air quality corresponds to "bad" and the processor 120 may rotate the air conditioner 100 at a relatively fast speed corresponding to the "strong". Alternatively, the processor 120 may rotate the air conditioner 100 at a relatively slow speed corresponding to "weak" when the identified concentration of the gas is identified as a value lower than a predetermined threshold, and the air quality corresponds to "good". According to the rotational speed of the air conditioner 100, the user may easily recognize that, in a space adjacent to the air conditioner 100, there is a gas harmful to the human body or the concentration of the gas is high. The air conditioner 100 may perform an air cleaning operation without rotation.

The processor 120 may determine the rotational speed of the air conditioner 100 based on at least one of information about the gas type or information about the gas concentration. For example, the processor 120 may determine the rotational speed at a speed faster than the rotation speed of the air conditioner 100 when the air quality is worse than the present based on the current indoor air quality condition, and may rotate the air conditioner 100 at the determined rotational speed.

The processor 120 may determine a color to be displayed on the air conditioner 100 based on at least one of information about a gas type or information about gas concentration and may display the determined color through a display (not shown).

The processor 120 may display the determined color through a light emitting diode (LED) light source located at a region of the air conditioner 100.

For example, if the identified type of gas corresponds to the harmful gas subject to indoor regulation, the processor 120 may control the LED light source to indicate a red color corresponding to the air quality which is "bad". Alternatively, the processor 120 may control the LED light source to indicate a blue color corresponding to the air quality "good" when the identified concentration of the gas is identified as a value lower than a predetermined threshold. According to the color displayed through the LED light source, the user may easily recognize that, in a space adjacent to the air conditioner 100, there is gas harmful to the human body or the concentration of the gas is high. For example, the LED light source may be disposed in at least one of an upper end portion, a side portion, or a lower portion of the air conditioner 100, and may be disposed in a band-like shape. For example, when the LED light source is disposed at the lower end of the air conditioner 100, light may be irradiated to a bottom surface of the indoor space so that light may be reflected to a bottom surface. The user may identify the color of light reflected from the bottom surface to easily recognize the condition of the indoor air quality.

The LED light source may be implemented in a form of being included in a display.

The processor 120 may sequentially emit the LED light source based on the determined color. The LED light sources may be arranged in various positions, other types of light sources may be used as well as the LED light sources, and colors displayed according to the gas concentration may be variously changed.

As illustrated in FIG. 1, if a shape such as an eye of a human is displayed on the display of the air conditioner 100, the processor 120 may change the shape of the eye based on at least one of information about the gas type or information about the gas concentration. For example, if the identified type of gas corresponds to the harmful gas subject to indoor regulation, the processor 120 may display a shape of an eye as a crying shape, and when the concentration of the identified gas is identified as a value lower than a predetermined threshold value, the processor 120 may display an eye shape as a smiling shape. This will be described in detail with reference to FIG. 8.

The processor 120 may generate a control signal for controlling at least one external device (not shown) based on the second gas sensing data obtained in the target space, and control the communication unit (not shown) to transmit the generated control signal to at least one external device performing a function related to the air conditioning operation. The external device for performing the function related to the air conditioning operation may include a humidifier, an air conditioner, a dehumidifier, an air blower, a kitchen hood, a ventilation system for controlling the opening and closing of a window, or the like.

For example, if ethanol or ammonia gas is identified in the kitchen space, the processor 120 may generate a control signal for controlling a kitchen hood and transmit the generated control signal to the kitchen hood to turn on a hood device. Accordingly, the kitchen hood device may perform an air conditioning operation for removing ethanol or ammonia gas along with the air conditioner 100.

The processor 120 may transmit information on the second gas sensing data and the gas type to a terminal device (not shown) such as a smartphone. Not only the air conditioner 100 but also an external device performing a function related to the air conditioning operation may be remotely controlled based on user input through the terminal device and perform an air conditioning operation.

The processor 120 may control the storage 110 to store at least one of type information or gas concentration information and information incorporating context information for the target space. The context information for the target space refers to the situation information of the target space, and may include, for example, a sleep situation, a cooking situation, and the like. The context information may be obtained based on information received from a user input or an external device.

According to an embodiment, the processor 120 may provide a notification to receive context information when a particular type of gas is identified or a specific type of gas is detected above a predetermined threshold. For example, when ammonia or ethanol gas is identified, the processor 120 may provide a user interface (UI) through a speaker (not shown) or through a display (not shown) to request input of the current context information to the user. If the current context input from the user is a cooking situation, the processor 120 may store the integrated information in which the ammonia or ethanol gas is integrated with the cooking situation in the storage 110. A user input for the context information may be performed through the terminal device.

According to another embodiment, the processor 120 may obtain context information based on information received from the external device. For example, a smart watch worn by a user may identify the user's sleeping situation. When the user receives the context information that the user is currently sleeping from the smart watch through the communication unit, the processor 120 may sense the second gas sensing data in a space adjacent to the sleeping user to obtain information about the type of the gas and the information about concentration of the gas. For example, the processor 120 may identify Isoprene or carbon dioxide in a space adjacent to the sleeping user. In this example, the processor 120 may store the integrated information in which the isoprene or carbon dioxide is integrated with the sleeping situation in the storage 110.

The processor 120 may identify a current context for the target space based on the second gas sensing data, generate a control signal for controlling the at least one external device based on the identified context, and control the communication unit to transmit the generated control signal to at least one external device performing a function related to the air conditioning operation.

When the gas identified based on the second gas sensing data and the reference data is identified as ammonia or ethanol gas, the processor 120 may identify the current context as a cooking situation and generate a control signal for controlling the kitchen hood. The processor 120 may then transmit the generated control signal to the kitchen hood to turn on the hood device to perform an air conditioning operation to remove ethanol or ammonia gas along with the air conditioner 100.

As another example, if the gas identified based on the second gas sensing data and the reference data is isoprene or carbon dioxide, the processor 120 may identify the current context as a sleeping situation and transmit a control signal to illumination to lower level of illumination or turn off the power of the illumination. The processor 120 may generate and transmit signals for controlling various devices as well as external devices related to the air conditioning operation.

The processor 120 may perform an air conditioning operation based on the identified current context information. For example, if the current context is identified as a sleeping situation, the processor 120 may switch to a sleep mode to perform an air conditioning operation in a state where noise is reduced.

According to another embodiment, the processor 120 may provide a notification for receiving context information based on an image obtained through a camera (not shown). For example, if a kitchen cooking scene is included in the obtained image, the processor 120 may ask whether the current context is a cooking situation. For example, the processor 120 may provide a UI through a display or voice through a speaker to ask the current context information to the user. When the current context is identified as a cooking situation, the processor 120 may transmit a control signal for turning on the kitchen hood or move the air conditioner 100 to a kitchen space to perform an air conditioning operation. The current context may be predicted through a training model based on machine learning that learns various images corresponding to each context.

The processor 120 may move the air conditioner 100 to identify a structure of the indoor space and obtain an indoor air quality map based on at least one of the first gas sensing data or the second gas sensing data. This will be described with reference to FIG. 7.

FIGS. 7A, 7B, and 7C are diagrams illustrating an operation to obtain a structure of an indoor space and an air quality map according to an embodiment.

FIG. 7A is a diagram illustrating a structure of an indoor space and a traveling route of the air conditioner 100.

The processor 120 may control a traveling unit (not shown) to move the air conditioner 100. The air conditioner 100 may move to an arbitrary space under the control of the processor 120, and the processor 120 may identify a structure of the indoor space based on data obtained from a proximity sensor (not shown) provided in the air conditioner 100 or data obtained from a LIght Detection And Ranging (LIDAR) sensor (not shown).

As illustrated in FIG. 7A, the processor 120 may identify a layout 710 of the indoor space based on the obtained data. A solid line 720 represents a travelling line of the air conditioner 100. The processor 120 may move the air conditioner 100, identify an indoor space structure, and perform an air conditioning operation. The layout 710 of the indoor space may be a layout including at least one of home appliances or furniture.

The processor 120 may update the layout 710 of the indoor space according to the movement of the air conditioner 100, and when the updated indoor space layout is different from the previously obtained layout of the indoor space, the processor 120 may provide notification to the user or ask whether an indoor space layout is changed through a display, a speaker, or the like.

When an input indicating that there is a change in the layout of the indoor space is received from the user, the processor 120 may change (update) the layout 710 of the indoor space according to the changed layout information. As an example, when an input indicating that there is a change in an indoor space layout by arranging new furniture or the like is received from a user, the layout 710 of the indoor space may be changed to a layout in which a new furniture is reflected. However, when a temporary obstacle such as a book is placed, an input indicating that there is no change in an indoor space layout may be received from a user. In this example, the processor 120 may not change the layout 710 of the indoor space.

FIG. 7B is a diagram illustrating an indoor air quality map.

As shown in FIG. 7A, the processor 120 may identify a structure of an indoor space and obtain indoor air quality information corresponding to each region of the indoor space based on at least one of first gas sensing data or second gas sensing data. The processor 120 may display the obtained indoor air quality information in the layout 710 of the indoor space. For example, the processor 120 may display a condition of the indoor air quality based on at least one of information about the gas type or information about the gas concentration, and may display the condition of the indoor air quality as good 730, medium 740, and bad 750. The indoor air quality condition may be divided into different colors, images, text, etc. on the layout 710 of the indoor space. However, the embodiment in which the indoor air quality condition is divided into good 730, medium 740, and bad 750 is merely embodiment and it may be further subdivided.

It is assumed that there is a change in indoor air quality with a change in the layout of the indoor space. In this case, the processor 120 may ask about an indoor space layout change through a display or a speaker as described above, and may provide information about indoor air quality change. The processor 120 may operate at least one of the air conditioner 100 or the external device or provide guide information corresponding to a change in the indoor air quality. The processor 120 may periodically provide information about the trend of air quality change.

For example, a new furniture or the like may be disposed and the concentration of the formaldehyde may rapidly increase. The processor 120 may provide information informing that the concentration of the formaldehyde has been increased, and when an input indicating that there is a change in the indoor space layout is received from the user, the processor 120 may change (update) the layout 710 of the indoor space and may operate the air conditioner 100 such as turning on the air cleaner. In addition, a control signal for controlling the external device may be generated, and the generated control signal may be transmitted to at least one external device performing a function related to an air conditioning operation. The processor 120 may also provide a user behavior guide, such as a window ventilation. Even if an input indicating that there is a change in an indoor space layout is not received from a user, the processor 120 may perform an operation related to an air conditioning function.

FIG. 7C is a diagram illustrating an embodiment in which a position of the sensor 200 of the layout 710 of the indoor space is displayed.

The processor 120 may control the display to provide the layout 710 of the identified indoor space. The processor 120 may provide a notification for receiving the position of the sensor 200. For example, the processor 120 may display the indoor space layout 710 window and control the display to display a text window requesting input of the position of the sensor 200. When the position of the sensor 200 is input from the user, the processor 120 may display the sensor 200 on the layout 710 of the indoor space. As shown in FIG. 7C, the position of the first sensor 760 and the second sensor 770 may be displayed. Accordingly, the processor 120 may identify the position of the at least one sensor and may perform an air conditioning operation by moving the air conditioner 100 to a region where the corresponding sensor is located based on the sensing data received from the corresponding sensor. The processor 120 may also obtain an air quality map based on sensing data received from the corresponding sensor. Although the position of the sensor 200 is described above as being identified from the user input, the processor 120 may identify the position of the sensor 200 based on the intensity of signals between the air conditioner 100 and the sensor 200, or the like. Each of a first sensor 760 and a second sensor 770 may be a main sensor or a sub-sensor.

It is described that the processor 120 of the air conditioner 100 may obtain information on the gas type based on the second gas sensing data and the reference data, but according to another embodiment, a terminal device, such as a smart phone receiving second gas sensing data, may obtain information about a gas type.

Second Embodiment

The second embodiment is an example in which the main sensor is provided outside the air conditioner 100, and a separate sub-sensor is not present. The main sensor may be implemented as a separate device. For example, the plurality of main sensors may be installed in each room, living room, and kitchen space, respectively. In the second embodiment, the main sensor provided outside the air conditioner 100 is collectively referred to as a second sensor for convenience. A detailed description of the overlapped portion with the first embodiment will be omitted.

The processor 120 may identify the target space based on the first gas sensing data received from the second sensor and may move the air conditioner 100 to the target space. The second sensor may be a sensor located within the at least one target space.

The first gas sensing data may be data sensed in a low-power mode, which identifies only the normal state of the indoor gas, and may be data related to the indoor gas used to identify the target space to which the air conditioner 100 may move.

The second sensor may periodically transmit first gas sensing data to the air conditioner 100. The processor 120 may transmit a control signal to the second sensor to obtain second gas sensing data by sensing the indoor gas precisely by switching to a general mode, if the data distribution which is different from reference gas distribution is identified based on the first gas sensing data. The processor 120 may move the air conditioner 100 to a target space in which the second sensor is installed. The processor 120 may perform an air conditioning operation based on the second gas sensing data received from the second sensor. The processor 120 may obtain information on the gas type based on the second gas sensing data and the reference data stored in the storage 110, and perform an air conditioning operation on the basis of the information on the gas type. The first gas sensing data and the second gas sensing data may be data sensed by the same second sensor.

It is described that the processor 120 may identify whether the gas distribution is in a normal state based on the first gas sensing data, and obtain information on the gas type based on the second gas sensing data. However, the second sensor may directly identify whether the second sensor is a normal gas distribution based on the first gas sensing data, and may obtain information on the gas type based on the second gas sensing data.

When the first gas sensing data and the second gas sensing data are sensed through the second sensor, the processor 120 may transmit a control signal to the second sensor to sensor the gas sensing data in the same manner without dividing a mode such as a low-power mode and a general mode.

The air conditioning operation, an operation to transmit a control signal to at least one external device performing a function related to the air conditioning operation, or the like, are overlapped with the first embodiment and will not be described in detail.

Third Embodiment

In the third embodiment, the main sensor is provided inside the air conditioner 100, and the sub-sensor is provided outside the air conditioner 100 to be implemented as a separate device. For example, a plurality of sub-sensors may be installed in each room, living room, and kitchen space, respectively. In the third embodiment, a main sensor provided inside the air conditioner 100 is commonly referred to as an internal sensor, and a sub-sensor provided outside is referred to as an external sensor. A detailed description of the overlapped portions of the first and second embodiments will be omitted.

The processor 120 may identify the target space based on the first gas sensing data and move the air conditioner 100 to the target space. The first gas sensing data may be data sensed by an external sensor located in the target space.

The external sensor is configured to sense the distribution state of the indoor gas, and may include a solar heat charging panel. The solar heat charging panel may be an energy harvesting-based panel. The thermal energy may be converted into electrical energy through the solar heat charging panel such that the external sensor itself may generate power. For example, the external sensor may convert thermal energy generated from the Sun, fluorescent lamps, incandescent lamps, etc. into electrical energy to generate electric power. It is not limited thereto and the external sensor may be driven through external power such as power supply through an outlet, or the like. Meanwhile, the external sensor may additionally include a Total Volatile Organic Compounds (TVOC) sensor, a CO2 sensor, or the like.

The external sensor may periodically transmit first gas sensing data to the air conditioner 100. The processor 120 may move the air conditioner 100 to the target space when a gas distribution different from the gas distribution in a normal state is identified based on the first gas sensing data. When the air conditioner 100 is moved to the target space, the processor 120 may control the internal sensor to obtain second gas sensing data. The second gas sensing data may be the data sensed by the internal sensor included in the air conditioner 100.

The processor 120 may perform an air conditioning operation based on the second gas sensing data obtained by the internal sensor. Specifically, the processor 120 may obtain information on the gas type based on the second gas sensing data and the reference data stored in the storage 110, and perform an air conditioning operation on the basis of the information on the gas type.

The processor 120 may identify whether the gas distribution is of the normal condition based on the first gas sensing data received from the external sensor, but an external sensor itself may identify whether the gas distribution is of the normal condition based on the first gas sensing data.

The air conditioning operation performed by the air conditioner 100 in the target space and an operation of transmitting the control signal to at least one external device performing the function related to the air conditioning operation, or the like, are overlapped with the first embodiment and a detailed description will be omitted.

In some examples, the main sensor may be provided inside or outside the air conditioner 100.

Figure 3:
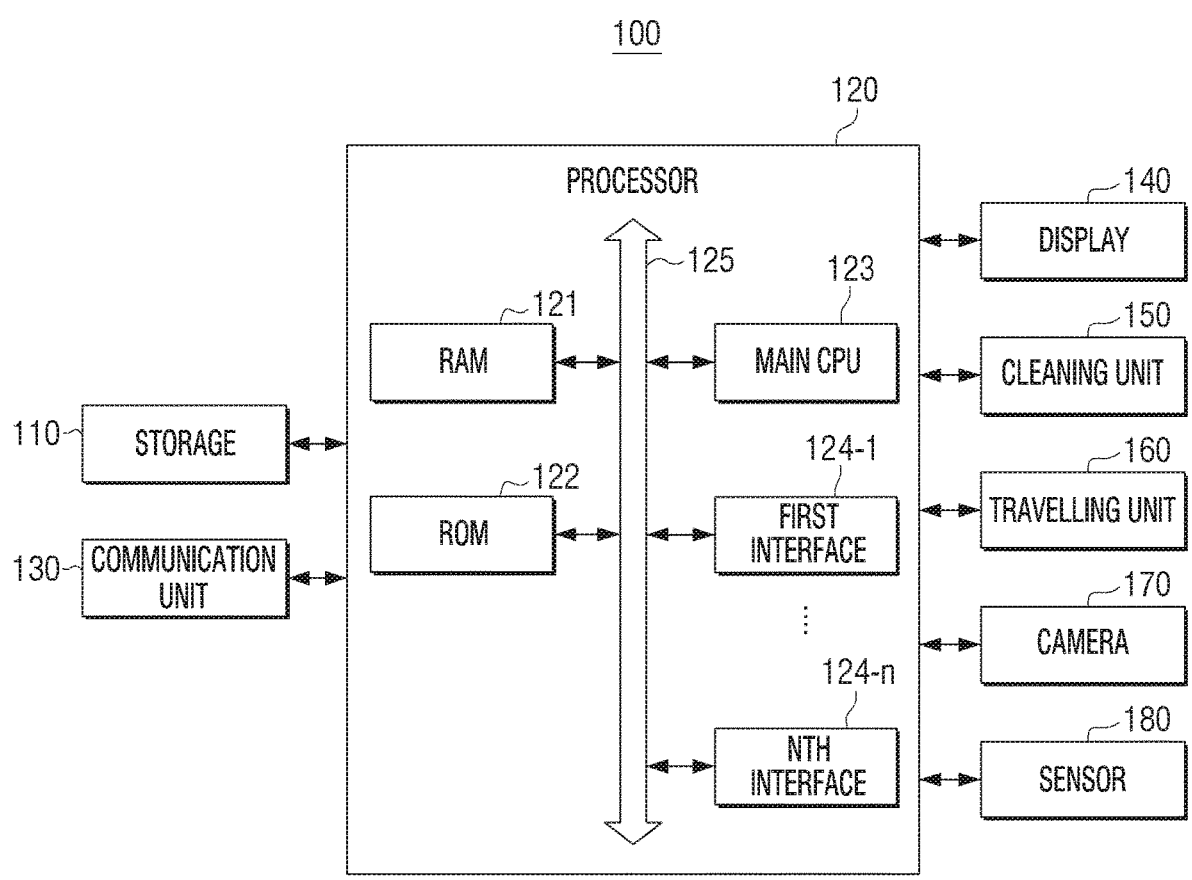
FIG. 3 is a block diagram illustrating a detailed configuration of an air conditioner.

FIG. 3 is a block diagram illustrating a detailed configuration of the air conditioner.

Referring to FIG. 3, the air conditioner 100 includes the storage 110, the processor 120, a communication unit 130, a display 140, a cleaning unit 150, and a travelling unit 160. The configuration of FIG. 3 which is overlapped with the configuration of FIG. 2 will not be described in detail.

The storage 110 may be implemented as at least one of a memory embedded within the air conditioner 100 or a memory detachable from the air conditioner 100 according to the usage of data storage. For example, the data for driving the air conditioner 100 may be stored in the memory embedded within the air conditioner 100, and the data for upscaling of the air conditioner 100 may be stored in the memory detachable from the air conditioner 100. A memory embedded in the air conditioner 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the air conditioner 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The processor 120 controls overall operations of the electronic device 100 using various programs stored in the storage 110.

The processor 120 includes at least one of a random access memory (RAM) 121, a read-only memory (ROM) 122, a main central processing unit (CPU) 123, a first to $n^{th}$ interfaces 124-1-124-$n$, and a bus 125.

The RAM 121, the ROM 122, the main CPU 123, the first to $n^{th}$ interfaces 124-1 to 124-$n$, or the like, may be interconnected through the bus 125.

The ROM 122 stores one or more instructions for booting the system and the like. When the turn-on instruction is input and power is supplied, the CPU 123 copies the OS stored in the storage 110 to the RAM 121 according to the stored one or more instructions in the ROM 122, and executes the OS to boot the system. When the booting is completed, the CPU 123 copies various application programs stored in the storage 110 to the RAM 121, executes the application program copied to the RAM 121, and performs various operations.

The RAM 121, the ROM 122, the main CPU 123, the first to $n^{th}$ interfaces 124-1 to 124-$n$, or the like, may be interconnected through the bus 125.

The ROM 122 stores one or more instructions for booting the system and the like. When the turn-on instruction is input and power is supplied, the CPU 123 copies the OS stored in the storage 110 to the RAM 121 according to the stored one or more instructions in the ROM 122, and executes the OS to boot the system. When the booting is completed, the CPU 123 copies various application programs stored in the storage 110 to the RAM 121, executes the application program copied to the RAM 121, and performs various operations.

The communication unit 130 is configured to communicate with a sensor located outside, an external device, or an external server according to various communication methods. For example, the communication unit 130 may use a communication method such as a BlueTooth (BT), wireless fidelity (WI-FI), Zigbee, infrared (IR), serial interface, universal serial bus (USB), near field communication (NFC), vehicle to everything (V2X), cellular, or the like, to communicate with a sensor located outside, an external device, or an external server according to wired/wireless communication methods.

The communication unit 130 may receive gas sensing data from a sensor located outside. The communication unit 130 may transmit a control signal to an external device under the control of the processor 120. The communication unit 130 may receive the reference data and data regarding the reference gas distribution from the external server.

The display 140 is configured to display various information. The display 140 may display information about indoor air quality. The display 140 may display at least one of identified type information or concentration information of the gas according to the control of the processor 120.

The display 140 may be implemented in the form of a touch screen that forms a layout structure with a touch pad. The display 140 may be used as a user interface (not shown) receiving a user input other than an output device. The touch screen may be configured to detect the pressure of a touch input as well as touch input position and an area. The display 140 may provide the user with a UI requesting input of the current context information.

The display 140 may be implemented as various types such as a liquid crystal display (LCD), organic light-emitting diode (OLED), Liquid Crystal on Silicon (LCoS), Digital Light Processing (DLP), quantum dot (QD), or Micro light-emitting diode (micro LED).

The cleaning unit 150 is configured to inhale, filter, and discharge air. The cleaning unit 150 includes a pre-filter 910, a high efficiency particulate air (HEPA) filter 920, a photo-catalytic filter 930, and a light source unit 940. This will be described in detail with reference to FIG. 9

The traveling unit 160 is configured to move the air conditioner 100, and may include a plurality of wheels. The traveling unit 160 may move the air conditioner 100 to an arbitrary space or a target space under the control of the processor 120.

The camera 170 may obtain an image around the air conditioner 100. The current context may be identified through the image captured by the camera 170. For example, if a kitchen cooking image is included in a captured image, the current context may be identified as a cooking situation.

The sensor 180 may include at least one of a proximity sensor or Lidar sensor.

The proximity sensor is configured to sense proximity of a peripheral object. Based on the data obtained from the proximity sensor, a structure of an indoor space may be identified.

The LIDAR sensor is a sensor emitting laser and capable of detecting a surrounding environment such as a shape of an object, a distance to an object, and the like, by using light which returns after being reflected from a surrounding object. That is, a structure of an indoor space may be identified based on data obtained from the LIDAR sensor.

The air conditioner 100 may further include a docking unit (not shown) for charging power, an air blower (not shown), and a speaker, in addition to the configuration described above.

FIGS. 5A, 5B, 5C, and 5D are diagrams illustrating an operation of identifying a gas type based on learning data according to an embodiment.

Figure 5A:
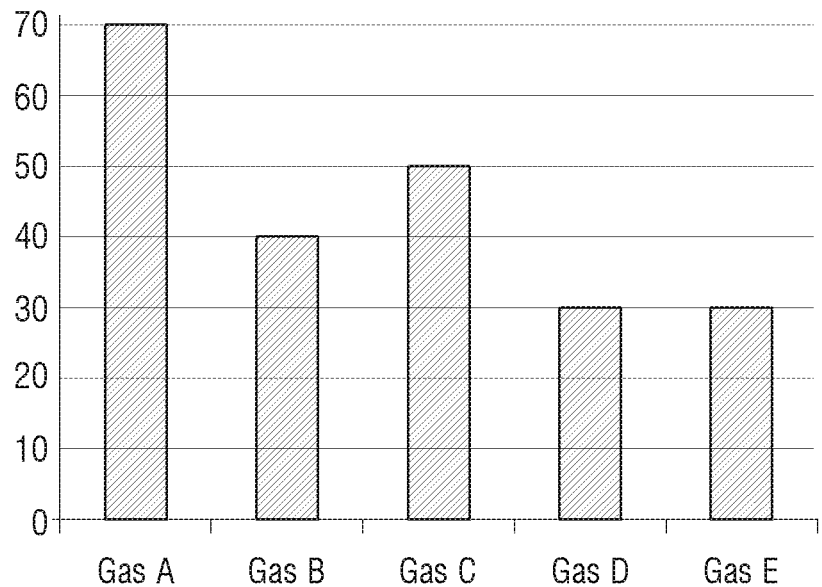
FIG. 5A is a graph illustrating a reaction value for a plurality of gases by each of a first sensing module and a second sensing module among a plurality of sensing modules included in the main sensor.
Figure 5A:
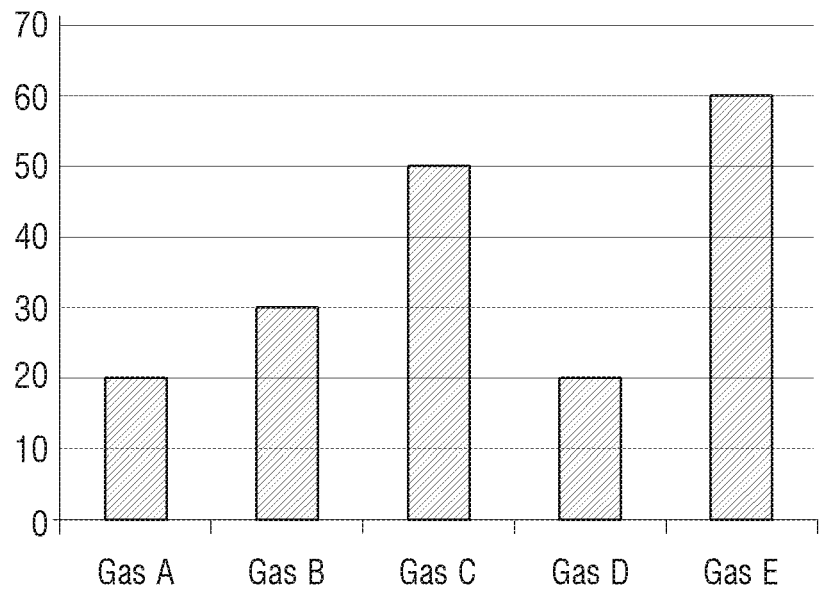

FIG. 5A is a graph illustrating a reaction value for a plurality of gases by each of a first sensing module and a second sensing module among a plurality of sensing modules included in the main sensor.

For example, the first sensing module may react to gas A as 70, react to gas B as 40, react to gas C as 50, react to gas D as 30, and react to gas E as 30. The air conditioner 100 may identify and identify gas A to gas C based on the reaction value of the first sensing module, but the gas D and the gas E may not be distinguished.

The second sensing module may react to gas A as 20, react to gas B as 30, react to gas C as 50, react to gas D as 20, and react to gas E as 60. The air conditioner 100 may not distinguish the gas A and the gas D based on the reaction value of the second sensing module.

When considering the reaction values measured by the first sensing module and the second sensing module, the air conditioner 100 may distinguish the gas D and the gas E, and the gas A and the gas D. For example, since the reaction value measured by the first sensing module with respect to the gas D and the gas E is the same, but the reaction value measured by the second sensing module is different, the air conditioner 100 may distinguish the gas D and the gas E. That is, different types of gases may be clearly distinguished through the plurality of sensing modules.

The reference data may be generated based on the reaction pattern representing the reaction value measured in each sensing module for one gas. For example, the reaction value is 70 in the first sensing module, and the reaction value is 20 in the second sensing module, the sensed gas may be identified as gas A.

Figure 5B:
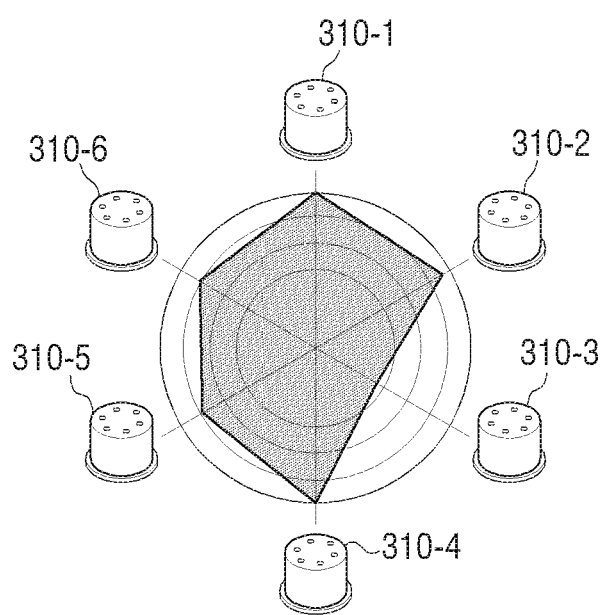
FIG. 5B is a diagram illustrating a reaction pattern of the plurality of sensing modules for a specific gas.

FIG. 5B is a diagram illustrating a reaction pattern of a plurality of sensing modules for a specific gas. FIG. 5B assumes that there are six sensing modules 200-1 to 200-6.

FIG. 5B illustrates a reaction value of each of the plurality of sensing modules 200-1 to 200-6 with respect to the gas F as a reaction pattern, and may be reference data for the gas F. If the reaction pattern of the plurality of sensing modules 200-1 to 200-6 is as illustrated in FIG. 5B, the air conditioner 100 may identify that the gas F is present in the corresponding area.

Figure 5C:
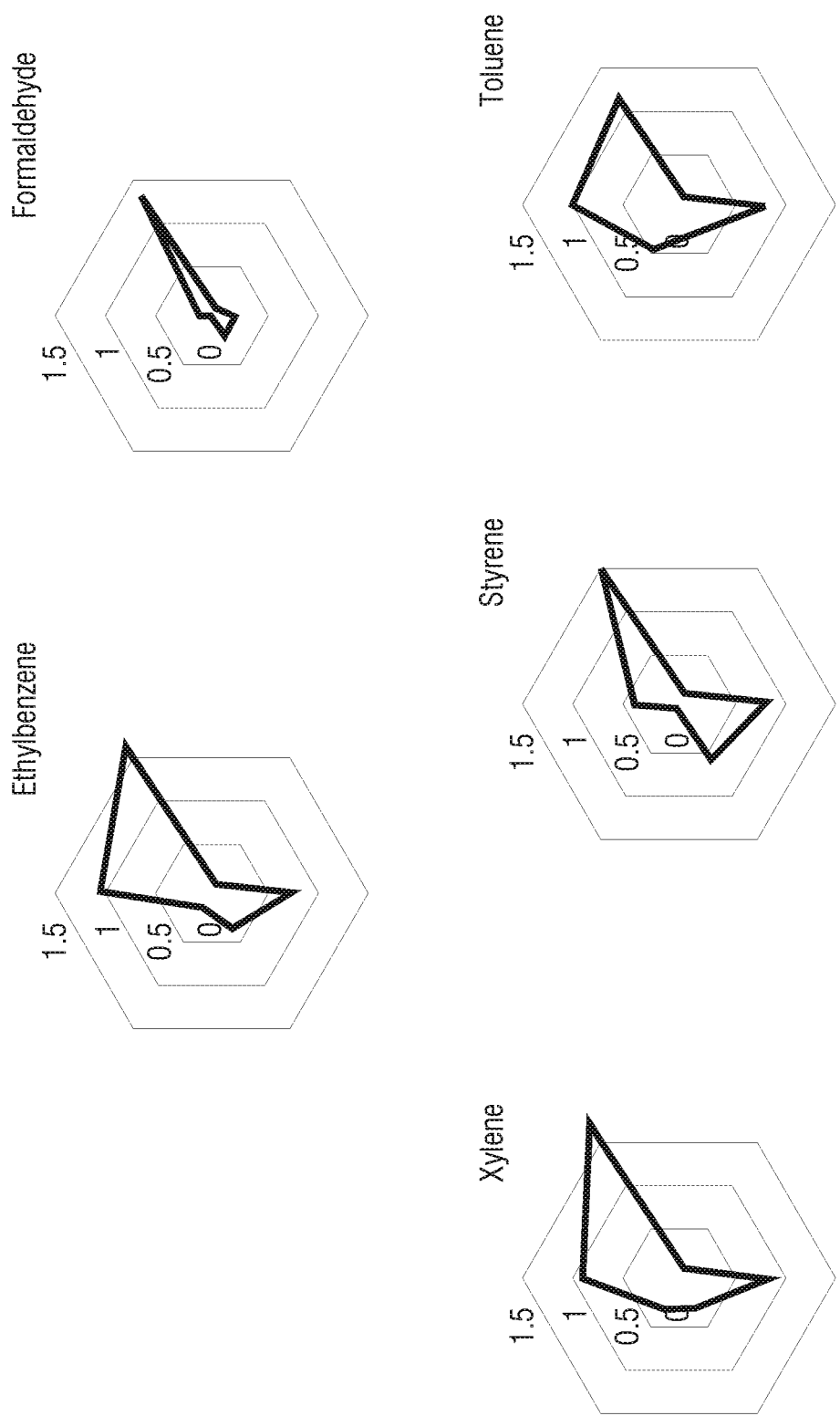
FIG. 5C is a diagram illustrating a reaction pattern of a plurality of sensing modules for each of ethylbenzene, formaldehyde, toluene, styrene, and xylene.

FIG. 5C is a diagram illustrating a reaction pattern of a plurality of sensing modules 200-1 to 200-6 for each of ethylbenzene, formaldehyde, toluene, styrene, xylene, respectively.

The air conditioner 100 may store learning data which has learned a reaction pattern for each of ethylbenzene, formaldehyde, toluene, styrene, and xylene, respectively, as reference data.

FIG. 5 is an example of six sensing modules, and the number, type, or the like, of the sensing module may be different, and the reaction pattern as illustrated in FIG. 5 may be different.

Figure 5D:
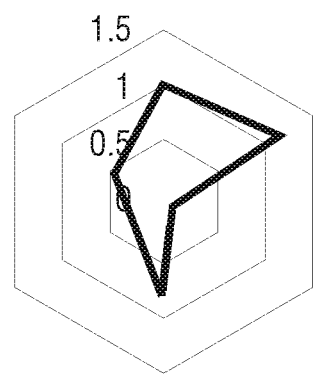
FIG. 5D is a diagram illustrating a reaction pattern included in the second gas sensing data obtained by the main sensor.

FIG. 5D illustrates a reaction pattern included in the second gas sensing data obtained by the main sensor. The air conditioner 100 may obtain information on a gas type based on the obtained reaction pattern and the learning data. The air conditioner 100 may compare the obtained reaction pattern as shown in FIG. 5D with stored learning data to identify that the corresponding gas is a toluene gas.

Figure 6:
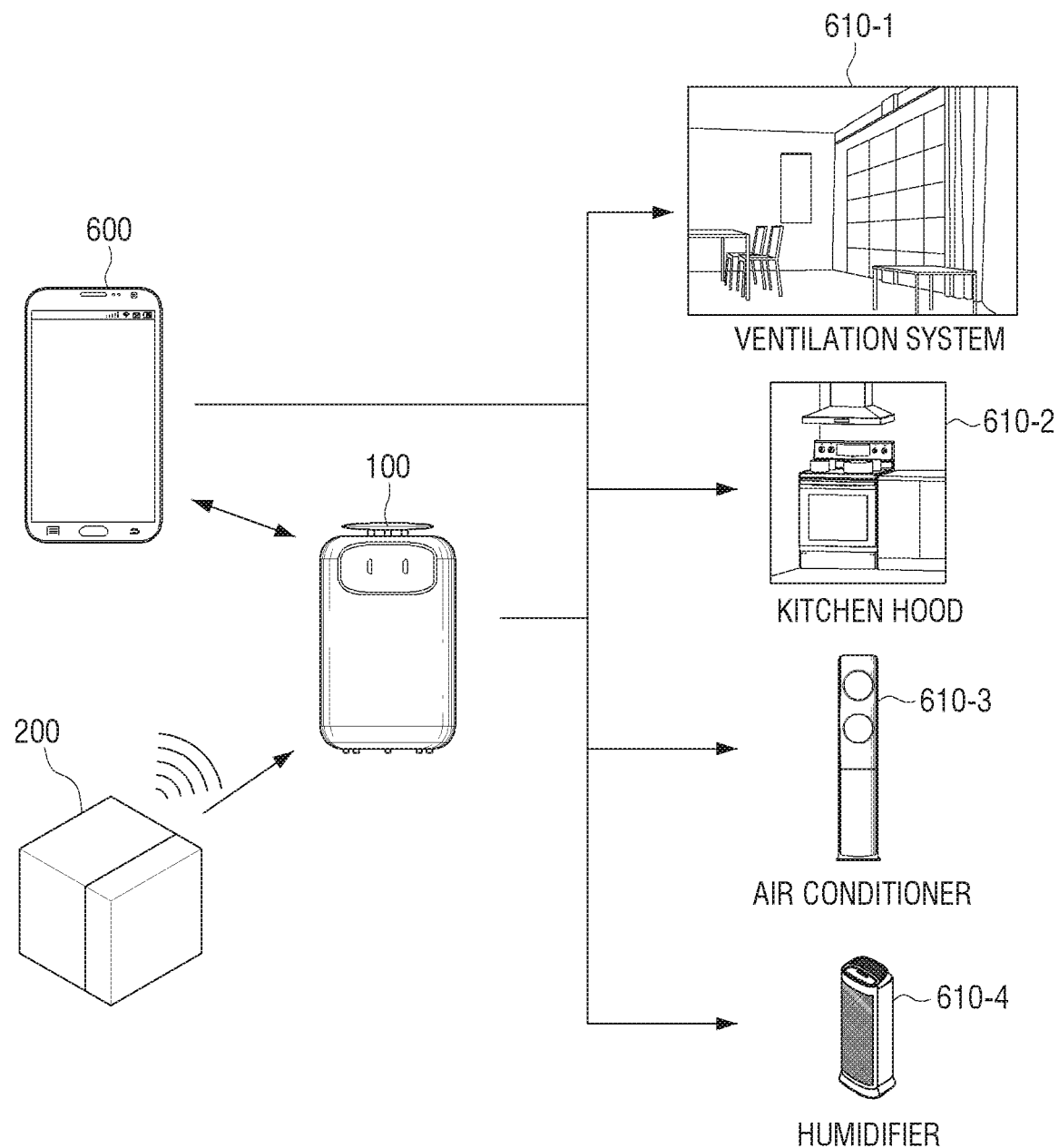
FIG. 6 is a diagram illustrating an operation to perform a function related to air conditioning along with an external device according to an embodiment.

FIG. 6 is a diagram illustrating an operation to perform a function related to air conditioning along with an external device according to an embodiment.

The air conditioner 100 may generate a control signal for controlling at least one external device 610 based on gas sensing data sensed by the sensor 200, and transmit the generated control signal to at least one external device 610 performing a function related to an air conditioning operation. In the case of FIG. 6, it is illustrated that the sensor 200 is located outside, but the embodiment is not limited thereto and the sensor 200 may be provided inside the air conditioner 100.

The external device 610 may be a device for performing a function related to an air conditioning operation and may include a ventilation system 610-1, a kitchen hood 620-2, an air conditioner 610-3, and a humidifier 610-4 for controlling the opening and closing of a window, or the like.

For example, when ethanol or ammonia gas is identified in the kitchen space, the air conditioner 100 may generate a control signal for controlling the kitchen hood 610-2 and transmit the generated control signal to the kitchen hood 610-2 to turn on the hood device 610-2. The kitchen hood device 610-2 may perform an air conditioning operation for removing ambient gas such as ethanol or ammonia gas along with the air conditioner 100.

The air conditioner 100 may transmit information on the second gas sensing data and the information about the gas type to the terminal device 600. Not only the air conditioner 100 but also the external device 610, which performs a function related to the air conditioning operation may be remotely controlled based on user input through the terminal device 600 to perform an air conditioning operation. The terminal device 600 may transmit a control signal for controlling an air conditioning operation to at least one of the air conditioner 100 or the external device 610.

FIGS. 8A, 8B, and 8C are diagrams illustrating an operation representing a condition of indoor air quality according to facial expressions displayed on an air conditioner according to an embodiment.

As shown in FIGS. 8A, 8B, and 8C, a shape of a human eye may be displayed on the display 140. The air conditioner 100 may change the shape of the eye based on at least one of the information about the gas type or the information about the gas concentration.

For example, the condition of the indoor air quality may be divided into good, medium, and bad. If the condition of the indoor air quality is good (FIG. 8A), the shape of the eye shown on the display 140 is displayed as a smiling shape, if the condition of the indoor air quality is medium (FIG. 8B), the shape of the eye shown on the display 140 is displayed as no expression, if the condition of the indoor air quality is bad (FIG. 8C), the shape of the eye shown on the display 140 may be displayed as a crying shape. However, the embodiment of dividing the indoor air quality condition into good, medium, and bad is merely one example, and may be further subdivided. Accordingly, the user may easily identify the air quality condition around the air conditioner 100.

FIG. 9 is an exploded perspective view of a cleaning unit according to an embodiment.

Referring to FIG. 9, the cleaning unit 150 includes the pre-filter 910, the HEPA filter 920, the photocatalytic filter 930, and the light source unit 940.

The pre-filter 920 may preliminary filter a comparatively large size dust particle.

The HEPA filter 920 is configured to filter fine dust which has not been filtered previously and may be made of, for example, glass fiber.

The photocatalytic filter 930 may perform an antibacterial function, air purification, deodorization, antifouling, and water purification by using a photocatalytic material. For example, the photocatalytic filter 930 may sterilize various pathogens and bacteria, remove harmful substances such as formaldehyde, toluene, nitrogen oxide (NOx), sulfur oxide (SOx), or the like, in the air, decompose stinking materials such as acetaldehyde, ammonia, hydrogen sulfide, or the like, decompose organic materials such as tobacco smoke and oil residue, or decompose harmful organic compounds of wastewater.

The light source unit 940 may irradiate ultraviolet rays or visible rays to the photocatalytic filter 930. Although FIG. 9 shows that the light source unit 940 is disposed on one surface of the photocatalytic filter 930, it is not limited thereto, but may be provided on both sides of the photocatalytic filter 930. The light source 940 is not necessarily disposed to face the photocatalytic filter 930, but may be arranged in various shapes if the light source 940 is in a position suitable for irradiating light to the photocatalytic filter 930.

Although FIG. 9 shows that the light source unit 940 is a lamp, it is not limited thereto, and the light source unit 940 may be implemented in various forms such as a chip in which a plurality of light emitting elements are arranged on a substrate.

In addition to the above-described configuration, a deodorization filter (not shown) including activated carbon may be further included between the pre-filter 910 and the HEPA filter 920. An arrangement order of the filters may be changed.

FIGS. 10A, 10B, 10C, and 10D are diagrams illustrating an embodiment of using data about air quality periodically measured according to an embodiment.

FIGS. 10A to 10D are data measured by times and may be divided by days. The data measured of FIGS. 10A to 10D may be obtained by a plurality of sensing modules.

In the data of FIG. 10A, concentrations of toluene and formaldehyde are measured individually. FIG. 10B illustrates data in which fine dust is measured, wherein concentration of fine dust of PM 2.5 and PM 10 is individually measured.

FIG. 10C illustrates data in which concentration of carbon dioxide is measured, and FIG. 10D illustrates data in which indoor temperature and humidity is measured.

In each data, a reference value related to an appropriate level of concentration, temperature, and humidity may be displayed together. Accordingly, the user may easily determine the measured condition of the indoor environment.

FIG. 10E is a diagram illustrating an embodiment of using measured data.

The air conditioner 100 may receive and store data regarding air quality sensed by the sensor 200 (i.e., data measured in FIGS. 10A-10D). The air conditioner 100 may transmit data regarding air quality to the terminal device 600. The terminal device 600 may display the received data, and the user may easily determine the condition of the indoor environment based on the displayed data.

The terminal device 600 may transmit data regarding air quality to a hospital. For example, assuming a patient with skin diseases, such as atopic dermatitis that may be caused by environmental factors, data relating to air quality may be used as an auxiliary (environment) data which may be reference to patient treatment. Data relating to air quality may be relatively accurate than describing indoor air quality orally by a patient, and thus appropriate treatment may be performed.

The terminal device 600 may transmit data regarding air quality to an external server (not shown) and may receive information for changing the indoor air quality from the external server. For example, guide information for changing indoor air quality such as window ventilation, air conditioner temperature adjustment, air purifier mode, and the like, may be received.

FIG. 11 is a flowchart illustrating a control method of an air conditioner according to an embodiment.

The air conditioner 100 may identify a target space based on the first gas sensing data and may move to the target space in operation S1110.

The first gas sensing data may be data sensed by a main sensor provided inside the air conditioner 100. Alternatively, the first gas sensing data may be data sensed by the main sensor or the sub-sensor located outside the air conditioner 100. The sub-sensor may include a solar heat charging panel. The solar heat charging panel is an energy harvesting-based panel, and since the thermal energy may be converted into electrical energy through the solar heat charging panel, the sub-sensor itself may generate power.

The air conditioner 100 may obtain information about the gas type based on the second gas sensing data sensed in the target space and the stored reference data in operation S1120.

The second gas sensing data may be data sensed by the main sensor provided inside the air conditioner 100 or data sensed by a main sensor located outside the air conditioner 100. The second gas sensing data may be data sensed by a sensor including a plurality of sensing modules that react to different gases. Here, the plurality of sensing modules are modules included in the main sensor.

The reference data may include learning data that has learned a reaction pattern of a plurality of sensing modules for each of a plurality of gas types.

The air conditioner 100 may obtain information on a gas type based on a reaction pattern and learning data of each of a plurality of sensing modules for second gas sensing data.

The air conditioner 100 may obtain not only information about the gas type but also information about gas concentration based on the second gas sensing data.

The air conditioner 100 may perform an air conditioning operation based on the information about the gas type in operation S1130. The air conditioner 100 may identify an air cleaning mode based on information about the gas type and information about the gas concentration, and perform an air cleaning operation based on the air cleaning mode. For example, if the gas identified as being present in the target space corresponds to a harmful gas subject to indoor regulation, the air conditioner 100 may select a harmful gas removal mode and perform a corresponding clean operation. Alternatively, if the identified gas is fine dust, the air conditioner 100 may select a general mode and perform a general clean operation.

The air conditioner 100 may identify the rotational speed of the air conditioner 100 based on at least one of information about the gas type or information about the gas concentration, and may rotate according to the identified rotational speed.

For example, if the identified gas corresponds to the harmful gas subject to indoor regulation, the air conditioner 100 may rotate at a relatively fast speed corresponding to "strong". Alternatively, the air conditioner 100 may rotate at a relatively fast speed corresponding to "strong" if the identified concentration of the gas is identified as a high value based on a predetermined threshold. According to the rotational speed of the air conditioner 100, the user may easily recognize that there is a gas harmful to the human body or the concentration of the gas is high.

The air conditioner 100 may generate a control signal for controlling at least one external device based on the second gas sensing data, and transmit the generated control signal to at least one external device performing a function related to an air conditioning operation. The external device for performing the function related to the air conditioning operation may include a humidifier, an air conditioner, a dehumidifier, an air blower, a kitchen hood, a ventilation system for controlling the opening and closing of the window, or the like.

For example, when ethanol or ammonia gas is identified in the kitchen space, the air conditioner 100 may generate a control signal for controlling the kitchen hood and transmit the generated control signal to the kitchen hood to turn on the hood device. Accordingly, the kitchen hood device may perform an air conditioning operation for removing ethanol or ammonia gas along with the air conditioner 100.

The air conditioner 100 may transmit information on the second gas sensing data and the gas type to the terminal device. Based on the user input through the terminal device, not only the air conditioner 100 but also the external device performing the functions related to the air conditioning operation may be remotely controlled to perform an air conditioning operation.

The air conditioner 100 may store information integrating at least one of type information or gas concentration information and context information for a target space. Here, the context information for the target space may refer to the situation information of the target space, and may include, for example, a sleep situation, a cooking situation, and the like. The context information may be obtained based on information received from the external device or the user input. Specifically, the air conditioner 100 may provide a notification for receiving context information from a user when a specific type of gas is identified or a specific type of gas is detected greater than or equal to a predetermined threshold. For example, the air conditioner 100 may provide a voice through a speaker or a UI through a display to request an input of current context information to a user. Alternatively, the air conditioner 100 may obtain context information based on information received from an external device. For example, a smart watch worn by a user may identify the user's sleep situation. The air conditioner 100 may receive information from a smart watch that a user is currently sleeping, and may identify isoprene or carbon dioxide in a space adjacent to the sleeping user. In this example, the air conditioner 100 may store integrated information in which isoprene or carbon dioxide is integrated with a sleep situation, which is context information.

Thereafter, the air conditioner 100 may identify the current context for the target space based on the second gas sensing data, generate a control signal to control at least one external device based on the identified context, and may control the communication unit to transmit the generated control signal to at least one external device performing a function related to the air conditioning operation.

Detailed operations have been described above and will not be further described.

The methods according to various embodiments can be implemented in an application type installable in an existing air conditioner.

Methods according to the embodiments as described above may be implemented as software upgrade or hardware upgrade for an existing air conditioner.

Embodiments described above may be performed through an embedded server provided in an air conditioner, or an external server of at least one air conditioner and a display device.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, electronic apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

Further, according to an embodiment of the disclosure, the various embodiments described above may be implemented in a recording medium that can be read by a computer or an apparatus similar to a computer, by using software, hardware, or a combination thereto.

The computer instructions for performing the processing operations of a device according to the various embodiments described above may be stored in a non-transitory computer-readable medium. The computer instructions stored in the non-transitory computer-readable medium cause the specific device to perform the processing operations according to the above-described various embodiments when executed by the processor of the specific device.

The non-transitory computer-readable medium may refer, for example, to a medium that stores data, such as a register, a cache, a memory or etc., and is readable by an apparatus. For example, the aforementioned various applications, instructions, or programs may be stored in the non-transitory computer-readable medium such as, for example, a compact disc (CD), a digital versatile disc (DVD), a hard disc, a Blu-ray disc, a USB drive, a memory card, a read only memory (ROM), and the like.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An air conditioner comprising:
   a first sensor;
   a storage; and
   at least one processor configured to:
      obtain, in a first sensing operation, first gas sensing data for determining whether an air conditioning operation is required,
      identify a target space, among a plurality of spaces, for which the air conditioning operation is required, based on the first gas sensing data, and control to move the air conditioner to the target space,
      obtain, in a second sensing operation, second gas sensing data for the target space,
      obtain information on a gas type based on the second gas sensing data and reference data stored in the storage, and
      control to perform an air conditioning operation based on the information on the gas type and context information including activity information regarding a current activity in the target space,
   wherein the second gas sensing data is acquired by the first sensor comprising a plurality of sensing modules that each react to a different gas, and
   wherein a power usage of the first sensor is reduced in the first sensing operation as compared to the second sensing operation.

2. The air conditioner of claim 1, wherein the reference data comprises learning data for a reaction pattern of the plurality of sensing modules for each of a plurality of gas types,
   wherein at least one processor is further configured to obtain the information on the gas type based on reaction patterns of each of the plurality of sensing modules for the second gas sensing data and the learning data.

3. The air conditioner of claim 1,
   wherein the first sensor is disposed inside the air conditioner.

4. The air conditioner of claim 1,
   wherein the first sensor is disposed inside the target space, and
   wherein at least one processor is further configured to:
      control to move the air conditioner to the target space based on the first gas sensing data, and
      perform the air conditioning operation based on the second gas sensing data.

5. The air conditioner of claim 1, further comprising a second sensor external to the air conditioner and disposed within the target space to acquire the first gas sensing data, and
   wherein the first sensor is an internal sensor configured to acquire the second gas sensing data.

6. The air conditioner of claim 5, wherein the second sensor comprises a solar heat charging panel.

7. The air conditioner of claim 1, wherein at least one processor is further configured to:
   obtain the information on the gas type and information on gas concentration based on the second gas sensing data, identify an air cleaning mode based on the information on the gas type and the information on the gas concentration, and perform an air cleaning operation based on the air cleaning mode.

8. The air conditioner of claim 7, wherein at least one processor is further configured to identify a rotational speed of the air conditioner based on at least one of the information on the gas type or the information on the gas concentration, and rotate the air conditioner based on the rotational speed.

9. The air conditioner of claim 1, further comprising:
a communication unit including a communication circuit,
wherein at least one processor is further configured to
generate a control signal to control at least one external device for performing a function related to an air conditioning operation based on the second gas sensing data, and
control the communication unit to transmit the generated control signal to the at least one external device.

10. The air conditioner of claim 1, further comprising:
a communication unit including a communication circuit,
wherein the storage is further configured to store information which integrates at least one of gas type information or gas concentration information, and the context information.

11. The air conditioner of claim 10, wherein the context information is obtained based on information received from the at least one external device or a user input.

12. The air conditioner of claim 1, wherein the plurality of sensing modules is configured to sense at least one of toluene or formaldehyde.

13. A control method of an air conditioner storing reference data, the method comprising:
obtaining, in a first sensing operation, first gas sensing data for determining whether an air conditioning operation is required;
identifying a target space among a plurality of spaces, for which the air conditioning operation is required based on the first gas sensing data and controlling to move the air conditioner to the target space;
obtaining second gas sensing data acquired in a second sensing operation from within the target space;
obtaining information on a gas type based on the second gas sensing data and stored reference data; and
controlling to perform an air conditioning operation based on the information on the gas type and context information including activity information regarding a current activity in the target space,
wherein the second gas sensing data is acquired by a first sensor and comprises gas sensing data for each of a plurality of gases of different types, and
wherein a power usage of the first sensor is reduced in the first sensing operation as compared to the second sensing operation.

14. The method of claim 13, wherein the reference data comprises learning data for a reaction pattern of a plurality of sensing modules for each of the plurality of gas types, wherein the obtaining of the information on a gas type is based on reaction patterns of each of the plurality of sensing modules for the second gas sensing data and the learning data.

15. The method of claim 13, wherein
the first sensor is disposed inside the air conditioner.

16. The air conditioner of claim 1, wherein the first sensor is configured to operate in a plurality of different operation modes and the first gas sensing data is obtained in a first operation mode of the plurality of different operation modes and the second gas sensing data is obtained in a second operation mode of the plurality of operation modes.

17. The method of claim 13, wherein the first gas sensing data is obtained in a first operation mode of a plurality of different operation modes of the first gas sensor and the second gas sensing data is obtained in a second operation mode of the plurality of operation modes of the first gas sensor.

18. A non-transitory computer readable storage medium storing instructions which, when executed, cause a processor to control an air conditioner to perform operations comprising:
obtaining, in a first sensing operation, first gas sensing data for determining whether an air conditioning operation is required;
identifying a target space, among a plurality of spaces, for which the air conditioning operation is required, based on the first gas sensing data, and control to move the air conditioner to the target space;
obtaining, in a second sensing operation, second gas sensing data for the target space;
obtaining information on a gas type based on the second gas sensing data and reference data stored in the storage; and
controlling to perform an air conditioning operation based on the information on the gas type and context information including activity information regarding a current activity in the target space,
wherein the second gas sensing data is acquired by a first sensor comprising a plurality of sensing modules that each react to a different gas, and
wherein a power usage of the first sensor is reduced in the first sensing operation as compared to the second sensing operation.

* * * * *